Figure 3:
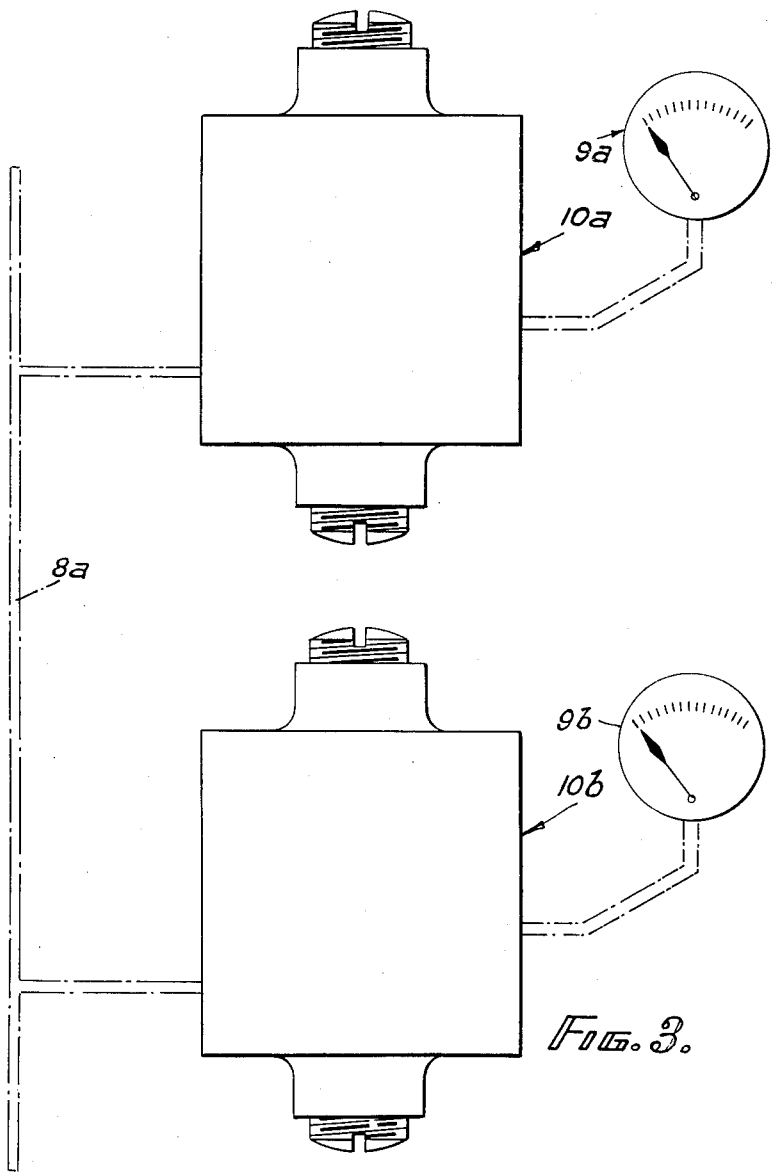

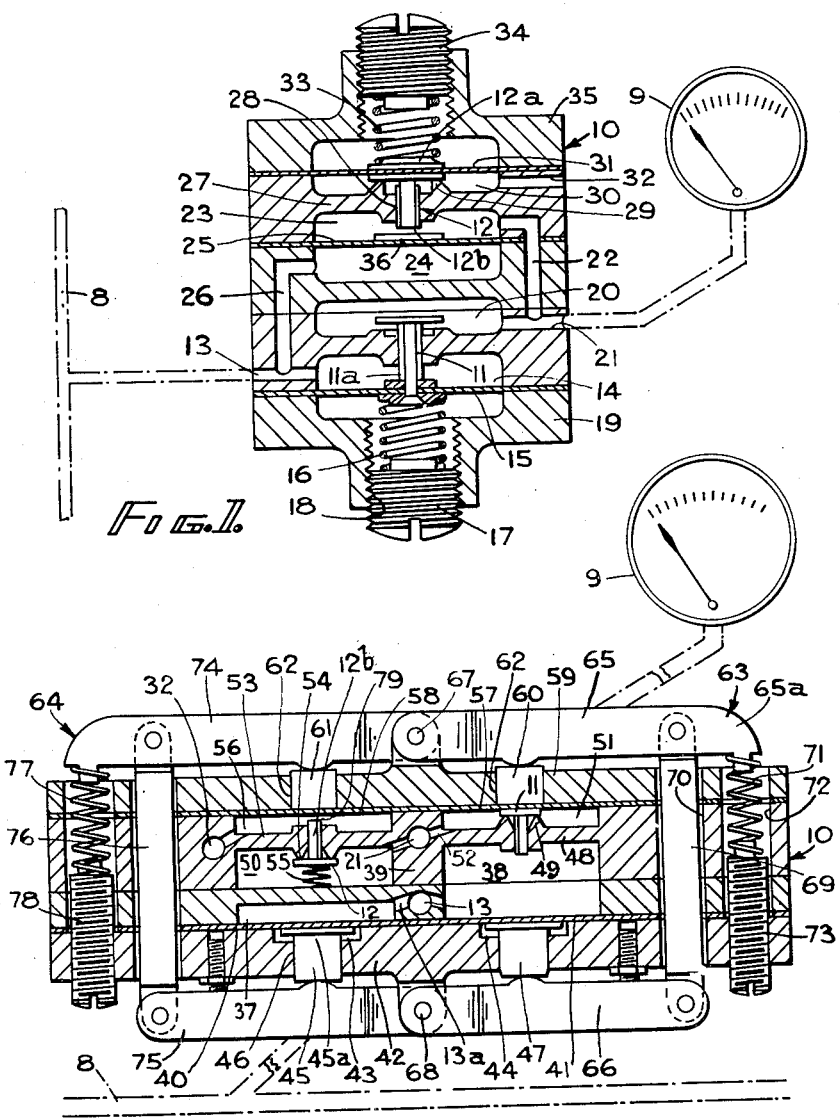

United States Patent Office 2,981,110
Patented Apr. 25, 1961

2,981,110

PRESSURE FLUID SYSTEMS

Arthur George Fenn, 156 Badminton Road, Bristol, England, and Reginald James Hunt, Rose Cottage, Tockington, England Filed Apr. 26, 1956, Ser. No. 580,880

Claims priority, application Great Britain Apr. 28, 1955

5 Claims. (Cl. 73—389)

This invention concerns pressure fluid systems of the kind comprising a pressure gauge and a cut-off valve in the supply line to the gauge, said valve being actuated, when the fluid pressure reaches a predetermined value, to discontinue the supply of fluid to the gauge. This is commonly done to prevent the gauge from being overstrained with increase in fluid pressure.

The object of the invention is to release fluid pressure from the gauge after the cut-off valve has been actuated in the manner indicated above. This has the advantage of ensuring that the gauge is not strained while the fluid supply to the gauge is discontinued. Moreover, when several gauges are being used at the same time, it clearly distinguishes the operative and the inoperative gauges whether observations be made by eye or photographically.

To attain the above object, according to the invention, a pressure fluid system of the kind set forth is provided which is characterised in that said fluid is utilised to open a valve means thereby to release fluid pressure from the gauge, after the cut-off valve has been actuated to discontinue the supply of fluid to the gauge. Preferably, upon a reduction in the fluid pressure, said release valve means is closed prior to the cut-off valve being actuated to re-establish the supply of fluid to the gauge. In this way it is ensured that the source of supply of pressure fluid can at no time exhaust through the cut-off valve and the release valve means so that no fluid is lost from the system.

According to a feature of the invention two or more pressure gauges are separately supplied from a common source and for each gauge there is provided a cut-off valve and a release valve means. With this arrangement it may be provided that at least one of release valve means is opened at a different fluid pressure to that at which another release valve means is opened.

The invention also includes within its scope release valve means for a pressure fluid system of the kind set forth, said means comprising a hollow body divided into two closed chambers each having a wall comprising a resilient diaphragm, one of the chambers being connectable with the supply of pressure fluid and the other chamber being connectable with the gauge downstream of the cut-off valve, and a normally closed valve for venting said other chamber and said pressure gauge, said valve being opened by deflection of the diaphragm forming the wall of said one chamber due to the fluid pressure in that chamber reaching a predetermined value.

Two practical embodiments of the invention in the form of a release valve means adapted to be connected to a pressure system and in which the cut-off valve of the system is incorporated to form a combined unit will now be described, by way of example, with reference to the accompanying drawings, in which:

Figure 1 is an axial section of release valve means comprising a hollow body divided into two chambers by a resilient diaphragm forming a common wall of the chambers and deflection of which operates a release valve, Figure 2 shown in axial section an alternative form of release valve means in which two chambers each have a wall formed by a separate resilient diaphragm, the two diaphragms coacting with each other to operate the release valve, and Figure 3 illustrates two pressure gauges which are separately supplied from a common supply line through release valve means similar to the means shown in Figure 1.

Referring to Figure 1 of the drawings, the release valve means shown therein, which also includes the cut-off valve of the pressure system, indicated diagrammatically at 8, to which the release valve means are to be connected, comprises a hollow cylindrical body 10 in which the cut-off valve 11 and release valve 12 are mounted so as to be slidable axially of the body. Fluid pressure from the system 8 is admitted to the body 10 through an inlet channel 13 which opens into a chamber 14 the lower end of which is formed by a resilient diaphragm 15 secured at its centre in a fluid-tight manner to the lower end of the stem 11a of the cut-off valve 11. A compression spring 16, arranged between the lower end of the stem 11a of the cut-off valve and an adjustable abutment 17 mounted in an axial threaded bore 18 formed in the lower end 19 of the body, urges the cut-off valve 11 upwardly to the open position shown.

Pressure fluid from the chamber 14 passes upwardly through the cut-off valve 11, the stem 11a of which is provided with longitudinal recesses to allow passage of the fluid, to a chamber 20 having an outlet channel 21 to which a pressure gauge 9 of the system is connected. From the outlet channel 21 a further channel 22 leads to a chamber 23 which is divided from a further chamber 24 by a resilient diaphragm 25. The chamber 24 is connected by means of a channel 26 to the inlet channel 13, so that the chambers 14 and 24 are connected to the inlet channel 13. A wall 27 forming the upper end of the chamber 23 has the release valve 12 slidably mounted in an axial bore 28 formed therein, the head 12a of the valve coacting with a seating 29 formed on the upper surface of the wall.

On its upper surface the wall 27 is recessed to form a chamber 30 the upper end of which is closed by a resilient diaphragm 31 the centre of which is connected in a fluid-tight manner to the head 12a of the release valve 12. An outlet channel 32 leads from the chamber 30 to a reservoir (not illustrated) into which fluid from the gauge is released after operation of the cut-off valve 11. Loading of the release valve 12 towards the lower closed position in which it is shown is effected by a compression spring 33 arranged between the head of the valve and an upper adjustable abutment 34 carried by the upper end 35 of the body 10.

Operation of the combined cut-off valve and release valve means takes place in the following manner. Pressure fluid from the chamber 14 escapes upwardly past the cut-off valve 11 into the chamber 20 and thence through the outlet channel 21 to the pressure gauge 9. Fluid at line pressure is also admitted to the chamber 23 through the channel 22. As the fluid pressure in the pressure system 8 connected to the inlet channel 13 increases, the resilient diaphragm 15 forming the lower end of the chamber 14 deflects downwardly against the loading of the spring 16 and pulls the cut-off valve 11 to its closed position to cut off line pressure to the pressure gauge and isolate it, the closing of the cut-off valve also isolating the chamber 23.

As already stated the chamber 24 is connected to the pressure system 8 so that further increase in the line pressure increases the pressure in the chamber 24 and the resilient diaphragm 25 dividing this chamber from the chamber 23 is deflected upwardly by the increasing pressure. Upward deflection of the resilient diaphragm 25 causes a plate 36 carried thereby to make contact with the lower end of the stem 12b of the release valve 12 and raise the latter from its seating 29 against the loading of the spring 33. Pressure fluid trapped in the pressure gauge 9 and chamber 23 thereupon escapes past the valve 12 into the chamber 30 and thence through the outlet channel 32 to the reservoir.

By means of the adjustable abutments 17 and 34 the pressure exerted by the springs 16 and 33 are adjusted so that the pressure necessary in the system to deflect the diaphragm 25 and open the release valve 12 to exhaust pressure fluid from the pressure gauge 9 is slightly in excess of that at which downward deflection of the diaphragm 15 actuates the cut-off valve 11 to disconnect the supply to the pressure gauge. It follows that when the supply pressure in the line falls the release valve 12 closes before cut-off valve 11 opens. Consequently in neither circumstances is the pressure fluid admitted through the inlet channel 13 permitted to escape through the cut-off valve 11 and release valve 12 and therefore the correct reading of the pressure gauge 9 is not affected.

In the alternative embodiment of the release valve means shown in Figure 2, the cut-off valve 11 and release valve 12 are again mounted in a cylindrical body 10 for axial movement therein, but are displaced laterally from the axis of the body. Pressure fluid entering the body through the inlet channel 13 flows into two chambers 37, 38, which are connected by a passage 13a and are separated from each other by a central wall 39 of the body in which the inlet channel 13, connecting channel 13a and outlet channel 21 to the pressure gauge 9 are formed. The lower ends of the chambers 37, 38 are closed by diaphragms 40, 41 respectively and in the example illustrated these diaphragms are manufactured as a single diaphragm serving the adjacent chambers and the lower face of which is supported by a lower end wall 42 of the body. Recesses 43, 44 are formed in the upper surface of the end wall 42 below the central portion of each of the diaphragms 40, 41 to allow outward deflection of these latter over a considerable area and a short headed rod 45 is mounted below the diaphragm 40 in an axial bore 46 formed in the end wall 42, the head 45a of the rod lying in the recess 43 and abutting the lower surface of the diaphragm 40. A similar headed rod 47 is arranged below the diaphragm 41.

At its upper end the chamber 38 is closed by a wall 48 in the centre of which the cut-off valve 11 is mounted so as to open outwardly of the chamber, an upper surface of the wall carrying the seating 49 for the valve. Above the chambers 37, 38 two further chambers 50, 51 are arranged respectively, such chambers being connected to each other to form a common chamber by a channel 52 formed through the central wall 39 and into which the channel 21 leading to the pressure gauge 9 opens. The release valve 12 is mounted in a wall 53 forming the upper end of the chamber 50, the release valve opening inwardly into the chamber and having a seating 54 formed centrally on the lower surface of the wall. A compression spring 55 is provided in the chamber 50 to maintain the release valve in the upper closed position illustrated. Above the chamber 50 a further chamber 56 is provided which is separated from the chamber 50 by the wall 53 and into which the upper end of the stem 12b of the release valve 12 projects. An outlet channel 32 leads from the chamber 56 to a reservoir (not illustrated) for pressure fluid trapped in the pressure gauge and the chamber 56.

At their upper ends the chambers 51 and 56 are closed by resilient diaphragms 57, 58 which are supported by an upper end wall 59 of the body 10 and may be formed as a single diaphragm in the manner already described. Short rods 60, 61 pass through bores 62 in the upper end wall 59 and are arranged so that their lower ends press centrally against the outer surface of the diaphragms 57, 58.

The inner ends of the rods 45, 47, 60 and 61 are maintained in contact with their respective diaphragms by means of toggle arrangements indicated generally at 63, 64, each of such toggle arrangements being of similar construction. The toggle arrangement 63 comprises two parallel levers 65, 66 which lie parallel to and above and below the end walls 59, 42 respectively and are mounted at their inner ends on pivots 67, 68 carried by the end walls. Towards their outer ends the levers 65, 66 are connected by a link 69 arranged axially of the body 10 and passing through a bore 70 formed therein, the length of the link being such that the levers are maintained in contact with the outer ends of the rods 60, 47. Biasing of the toggle arrangement 63 in an upward direction is effected by means of a compression spring 71 arranged in an axial bore 72 formed in the body 10, the upper end of the spring pressing against the outer end 65a of the lever 65 whilst its lower end presses against an adjustable abutment 73 mounted in the bore 72.

In a similar manner the toggle arrangement 64 comprises upper and lower levers 74, 75 connected by means of a link 76 and biased upwardly by means of a compression spring 77 adjustment of which may be effected by an abutment 78.

The action of the cut-off valve 11 and release valve 12 is as follows. Pressure fluid from the pressure line 8 enters the chambers 37, 38 through the inlet channel 13. As the toggle arrangement 63 is loaded upwardly by means of the spring 71 the cut-off valve 11 is forced upwardly from its seating 49 by the fluid pressure with slight upward deflection of the diaphragm 57, and pressure fluid passes past the valve into the chambers 51, 50 and the pressure gauge 9. Pressure in the chamber 38 also tends to deflect the diaphragm 41 downwardly but such deflection is prevented by the pressure of the spring 71 and the associated linkage and rod 47. As pressure builds up in the chamber 38 the diaphragm 41 is ultimately deflected downwardly as the unsupported area of the diaphragm above the recess 44 is larger than the unsupported area of the diaphragm 57, and the loading of the spring 71 is overcome so that the levers 65, 66 pivot downwardly and the cut-off valve 11 is closed by the inner end of the rod 60 and diaphragm 51. Isolation of the pressure gauge 9 and chambers 51, 50 from further increase in pressure in the line 8 is thus effected.

As the line pressure builds up increasingly in the chamber 37, the diaphragm 40 is deflected downwardly, such downward deflection causing downward movement of the rod 45 and toggle arrangement 64 against the loading of the spring 77. Downward movement of the lever 74 causes downward deflection of the diaphragm 58 by means of the rod 61 until a small gap 79 between the upper end of the stem 12b of the release valve 12 and the diaphragm 58 closes and the release valve is opened against the loading of the spring 55. Pressure fluid trapped in the chambers 51, 50 and pressure gauge 9 then escapes past the stem 12b of the release valve into the chamber 56 and thence through the outlet channel 32 to the reservoir, the differential areas of the diaphragm 58, 40 subjected to fluid pressure preventing the diaphragm 58 being moved upwardly by the fluid pressure in the chamber 56.

As long as the release valve 12 is held off its seating by pressure in the chamber 37, there is no pressure in the chambers 56, 50, 51 or the pressure gauge 9 and the needle thereof will return to zero until diminishing pressure in the pressure line 8 allows the release valve 12 to close and the cut-off valve 11 to open. Once adjustment of the springs 71, 77 has been effected to cause the cut-off valve 11 to open before the release valve 12 and the latter valve to close before the cut-off valve once more opens, the cycle of events works entirely automatically and no manual attention is required.

Although in the embodiments described the cut-off valve and release valve form parts of a single assembly, it will be appreciated that the release valve means may comprise a unit separate from the cut-off valve.

It may be arranged that two or more gauges are separately supplied from a common pressure source in which event a cut-off valve and a release valve is provided for each gauge. By suitable adjustment of the valves for the several gauges it may be arranged that the fluid is independently released from the gauges at different pressures.

Figure 3 illustrates an arrangement in which two pressure gauges 9a, 9b are separately supplied from a common pressure source 8a. Between the gauge 9a and the common pressure source 8a a hollow cylindrical body 10a containing a cut-off valve and a release valve is disposed, the general arrangements within the body being as already described in connection with the body 10 shown in Figure 1. A similar valve arrangement mounted within a body 10b is interposed between the pressure gauge 9b and the common pressure source 8a.

It is preferred that the fluid should be gradually supplied to a gauge and this may be done by delivering the fluid to the gauge through a restricted or throttled opening, for example, incorporated in the cut-off valve. In the embodiments described the inlet channel 13 may be of small diameter to achieve the above purpose. Such an arrangement ensures that pressure is not suddenly applied to the gauge such as may damage it. The restriction becomes operative during flow to the gauge and this arrangement ensures that the cut-off valve functions properly since operation of said valve is dependent on the rate of flow through the restriction.

We claim:

1. Release valve means for a pressure fluid system comprising a pressure gauge, a supply line to said pressure gauge, and a cut-off valve in the supply line to the pressure gauge and actuated, when the fluid pressure reaches a predetermined value, to discontinue the supply of fluid to the pressure gauge, said release valve means comprising a hollow body divided into two closed chambers each having a wall comprising a resilient diaphragm, one of the chambers being connectable with the supply of pressure fluid and the other chamber being connectable with said pressure gauge downstream of the cut-off valve, and a normally closed valve for venting said other chamber and said pressure gauge, said normally closed valve being opened by deflection of the diaphragm forming the wall of said one chamber due to the fluid pressure in that chamber reaching a predetermined value.

2. Release valve means for a pressure fluid system comprising a pressure gauge, a supply line to said pressure gauge, and a cut-off valve in the supply line to the gauge and actuated, when the fluid pressure reaches a predetermined value, to discontinue the supply of fluid to the gauge, said release valve means comprising a hollow body divided into two closed chambers by a resilient diaphragm, one of the chambers being connectable with said pressure gauge downstream of the cut-off valve, and a normally closed valve for venting said other chamber, said normally closed valve being opened by deflection of the diaphragm due to the fluid pressure in said one chamber reaching a predetermined value.

3. Release valve means according to claim 1, wherein said cut-off valve and said normally closed valve are incorporated in said body, said cut-off valve and said normally closed valve being connected by passing ways formed in the body.

4. Release valve means according to claim 2, wherein said cut-off valve is arranged to close a passage between said one chamber and said other chamber and said normally closed valve is arranged in said other chamber and opens to allow the pressure fluid in the chamber to escape to atmosphere.

5. A pressure fluid system comprising in combination a supply line, a plurality of pressure gauges each separately supplied from said supply line, a cut-off valve for each of said pressure gauges which is interposed between each pressure gauge and said supply line, means whereby each cut-off valve is actuated, when the fluid pressure in the supply line reaches a predetermined value, to discontinue the supply of fluid to the respective pressure gauge, a release valve means for each of said pressure gauges, means utilising pressure fluid from the system for opening each of said release valve means in order to release fluid pressure from the respective pressure gauge, after the appropriate cut-off valve has been actuated to discontinue the supply of fluid to said respective gauge, and means for adjusting the fluid pressure at which said release valve means are opened so that at least one of the release valve means is opened at a different fluid pressure to that at which another release valve means is opened.

References Cited in the file of this patent

UNITED STATES PATENTS

| 647,758 | Orr | Apr. 17, 1900 |
| 2,089,144 | Work | Aug. 3, 1937 |
| 2,353,191 | Samarin | July 11, 1944 |
| 2,558,534 | Bentley | June 26, 1951 |
| 2,731,026 | Hughes | Jan. 17, 1956 |

FOREIGN PATENTS

| 640,968 | Great Britain | Aug. 2, 1950 |